3,336,378
PROCESS FOR PREPARING ORGANIC DIMERIC
DITHIOPHOSPHONIC ANHYDRIDES
Ludwig Maier, Zurich, Switzerland, assignor to Monsanto Company, a corporation of Delaware
No Drawing. Filed July 26, 1963, Ser. No. 297,978
Claims priority, application Switzerland, July 31, 1962,
9,181/62
6 Claims. (Cl. 260—545)

The present invention relates to a novel process for preparing organic dimeric dithiophosphonic anhydrides of the general formula

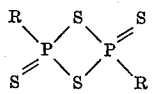

wherein R is an organic radical which is attached through a carbon atom.

The preparation of such compounds is well known from the literature. For example, ethyl-dithiophosphonic anhydride is obtained by treating the complex compound of aluminum chloride, phosphorus trichloride and ethylchloride with hydrogen sulfide (A. M. Kinnear and E. A. Perren, J. Chem. Soc. (London), 1952, 3437), or alkenyldithiophosphonic anhydrides by adding phosphorus pentasulfide to olefines (P. Fay and H. P. Lankelma, J. Am. Chem. Soc., 74, 4933, 1952), or aromatic dithiophosphonic anhydrides by action of phosphorus pentasulfide on benzene, naphthalene or anisol (U.S. Patent 2,870,-204), or alkyl and aryl dithiophosphonic anhydrides by reaction of thionophosphonic dichlorides with hydrogen sulfide (German patent application 1,099,535), or phenyldithiophosphonic anhydride by cleavage of tetraphenylcyclotetraphosphine with excess sulfur (W. Kuchen and H. Buchwald, Ber., 91, 2296, 1958).

It has been found that organic primary phosphines can be converted into the corresponding dithiophosphonic anhydrides by reaction with elemental sulfur in a stoichiometric ratio of 1:3. This reaction proceeds according to the scheme:

$$2RPH_2 + 6S \rightarrow [RPS_2]_2 + 2H_2S$$

The process of the invention is carried out at a temperature sufficient to cause the sulfur to react with the phosphine splitting off hydrogen sulfide and form the desired anhydride product. Preferably, the reaction is carried out at a temperature in the range of about 50° to about 200° C., and more preferably in the range of about 75° to about 150° C. For optimum yields obviously the time of reaction will vary inversely with the temperature of reaction; however, small yields of the desired anhydride product will be produced in relatively short periods of time of less than one hour. Reaction times will be in the range of about 15 minutes to 10 days, normally in the range of about 2 hours to 3 days. It is preferred, although not essential, to carry out the reaction in the presence of an inert organic solvent for the reactants, preferably a hydrocarbon solvent such as an aromatic solvent, e.g., benzene, toluene, the xylenes and mixtures thereof.

All primary phosphines, so far as these can be prepared and are sufficiently stable, can be subjected to the reaction. Primary phosphines which are well known and suitable for carrying out the invention are those in which R is, e.g., methyl, ethyl, n-propyl, iso-propyl, n-butyl, iso-butyl, tert.butyl, n-amyl, iso-amyl, n-heptyl, n-octyl, n-stearyl, allyl, benzyl, cyclopentyl, cyclohexyl, phenyl, 4-methylphenyl, 4-ethylphenyl, 2,4,5-trimethylphenyl, 2,4,6-trimethylphenyl, 4-phenylethylphenyl, etc. The hydrocarbon radicals can also show substituents, such as trifluoromethyl, 2-chloroethyl, perfluoroethyl, 4-chlorophenyl, 4-bromophenyl, hydroxyethyl, methoxyethyl, acetoxyethyl, benzoyloxyethyl, cyanoethyl, dichloroacetyl, trichloroacetyl, etc., or possess an olefinic or acetylenic bond like the radicals $CH_3C\!=\!C(CH_3)C(OH)CH_2$, $$CH_3(CH_2)_3C\!=\!C(CH_3)C(OH)CH_2$$

etc. Preferred phosphine starting materials for the process of the invention are those in which R is a hydrocarbon radical or a halogenated hydrocarbon radical having not more than 18 carbon atoms, more preferably not more than 8 carbon atoms.

The dimeric dithiophosphonic anhydrides are reactive compounds and suitable for the manufacture of insecticides and fungicides by reaction with alcohols or phenols. They can also be used as antiwear additives in lubricating oils.

The following examples will illustrate the process.

Example 1

In 50 ml. of toluene are refluxed 5.5 g. of phenylphosphine (0.05 mole) and 6.4 g. of finely comminuted sulfur (0.2 mole) for 18 hours. Yellow crystals separate on cooling. These are filtered off and washed with carbon sulfide. There are obtained 7.0 g. (=81.5%) of dimeric phenyldithiophosphonic anhydride; M.P. 231–236° C.

Analysis.—$C_{12}H_{10}P_2S_4$ (344.4). Calcd.: C, 41.84%; H, 2.92%; S, 37.23%. Found: C, 42.11%; H, 3.20%; S, 36.85%.

The determination of the molecular weight (ebulloscopic in carbon tetrachloride) gives 342. Crystal analysis by X-rays showed that per cell unit two molecules of dimeric phenyldithiophosphonic anhydride are present which possess a centre of symmetry. Thus the dimer is in the trans form.

Example 2

In 50 ml. of toluene are refluxed 2.4 g. of methylphosphine (0.05 mole) and 6.4 g. of finely comminuted sulfur (0.2 mole) for 18 hours. On cooling crystals of dimeric methyldithiophosphonic anhydride separate, are filtered off and washed with carbon disulfide providing a good yield of the desired product.

Example 3

In 50 ml. of toluene are refluxed 5.8 g. of cyclohexylphosphine (0.05 mole) and 6.4 g. of finely comminuted sulfur (0.2 mole) for 18 hours. On cooling crystals of dimeric cyclohexyldithiophosphonic anhydride separate, are filtered off and washed with carbon disulfide providing a good yield of the desired product.

What is claimed is:
1. A process for preparing compounds of the formula

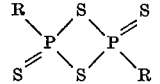

wherein R is a hydrocarbon radical linked to phosphorus through carbon comprising reacting sulfur with a primary organophosphine of the formula $RPH_2$ with R being as defined hereinabove in molar ratio of at least 3:1, respectively, at a sufficiently high temperature to split off hydrogen sulfide.

2. A process of claim 1 wherein an inert organic solvent is used.

3. A process of claim 1 wherein R is a hydrocarbon radical having not more than 18 carbon atoms.

4. A process of claim 1 wherein R is an aromatic hydrocarbon radical having not more than 8 carbon atoms.

5. A process of claim 1 wherein R is an alkyl radical having not more than 8 carbon atoms.

6. A process of claim 1 wherein R is a cycloalkyl radical having from 5 to 8 carbon atoms.

References Cited

Koehler, H., et al.: Ber. Deut. Chem., vol. 10, pp. 807–814 (pp. 810–812 relied on).

LORRAINE A. WEINBERGER, *Primary Examiner.*

H. C. WEGNER, *Assistant Examiner.*